US007673003B2

(12) United States Patent
Little, II

(10) Patent No.: US 7,673,003 B2
(45) Date of Patent: Mar. 2, 2010

(54) SOCIAL NETWORK EMAIL FILTERING

(75) Inventor: Charles Reeves Little, II, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 1476 days.

(21) Appl. No.: 10/835,373

(22) Filed: Apr. 28, 2004

(65) Prior Publication Data

US 2005/0246420 A1 Nov. 3, 2005

(51) Int. Cl.
G06F 15/16 (2006.01)
(52) U.S. Cl. .................. 709/206; 709/204; 709/207; 709/224; 709/225
(58) Field of Classification Search .............. 709/204, 709/206, 207, 224, 225
See application file for complete search history.

(56) References Cited

U.S. PATENT DOCUMENTS

| 6,073,165 | A * | 6/2000 | Narasimhan et al. ........ 709/206 |
| 6,161,130 | A | 12/2000 | Horvitz et al. |
| 6,266,692 | B1 | 7/2001 | Greenstein |
| 6,484,197 | B1 | 11/2002 | Donohue |
| 6,654,787 | B1 * | 11/2003 | Aronson et al. ............ 709/206 |
| 6,691,156 | B1 | 2/2004 | Drummond et al. |
| 7,428,579 | B2 * | 9/2008 | Libbey et al. .............. 709/206 |
| 2003/0167311 | A1 * | 9/2003 | Kirsch ..................... 709/206 |
| 2004/0255122 | A1 * | 12/2004 | Ingerman et al. ........... 713/176 |
| 2005/0076241 | A1 * | 4/2005 | Appelman .................. 713/201 |
| 2006/0031313 | A1 * | 2/2006 | Libbey et al. .............. 709/206 |
| 2006/0190606 | A1 * | 8/2006 | Kohavi ..................... 709/226 |
| 2006/0248573 | A1 * | 11/2006 | Pannu et al. ................ 726/1 |
| 2007/0180031 | A1 * | 8/2007 | Stern et al. ................ 709/206 |
| 2007/0271607 | A1 * | 11/2007 | Roskind .................... 726/15 |

FOREIGN PATENT DOCUMENTS

| WO | WO9937066 | 7/1999 |
| WO | WO2004088943 | 10/2004 |

OTHER PUBLICATIONS

Seairth et al., It Takes a Villlage to Stop Spam, Feb. 5, 2004, retrived on Oct. 1, 2006. p. 1-3.
Asami, et al; "A Taxonomy of Spam and a Protection Method for Enterprise Networks"; ICOIN 2002, LNCS 2344; pp. 442-452. 2002.
Blankenhorn; "E-mail audits clean lists, imporve response rates"; 3 pages; B to B; vol. 87, No. 6, Jun. 10, 2002.

* cited by examiner

Primary Examiner—Nathan Flynn
Assistant Examiner—Mohamed Wasel
(74) Attorney, Agent, or Firm—Lee & Hayes, PLLC

(57) ABSTRACT

A user's address book includes a first group of email addresses. Those email addresses are used to identify address books that include another group of email addresses. Multiple iterations may be used to identify several groups of email addresses, representing a user's social network. When an email message addressed to the user is received, the message is trusted if the sending email address is within the user's social network. Otherwise, the message is flagged as junk mail. Varying trust levels may be applied to messages that are received based on a distance within a social network between the sending email address and the user and/or how often the sending email address appears within the social network.

12 Claims, 9 Drawing Sheets

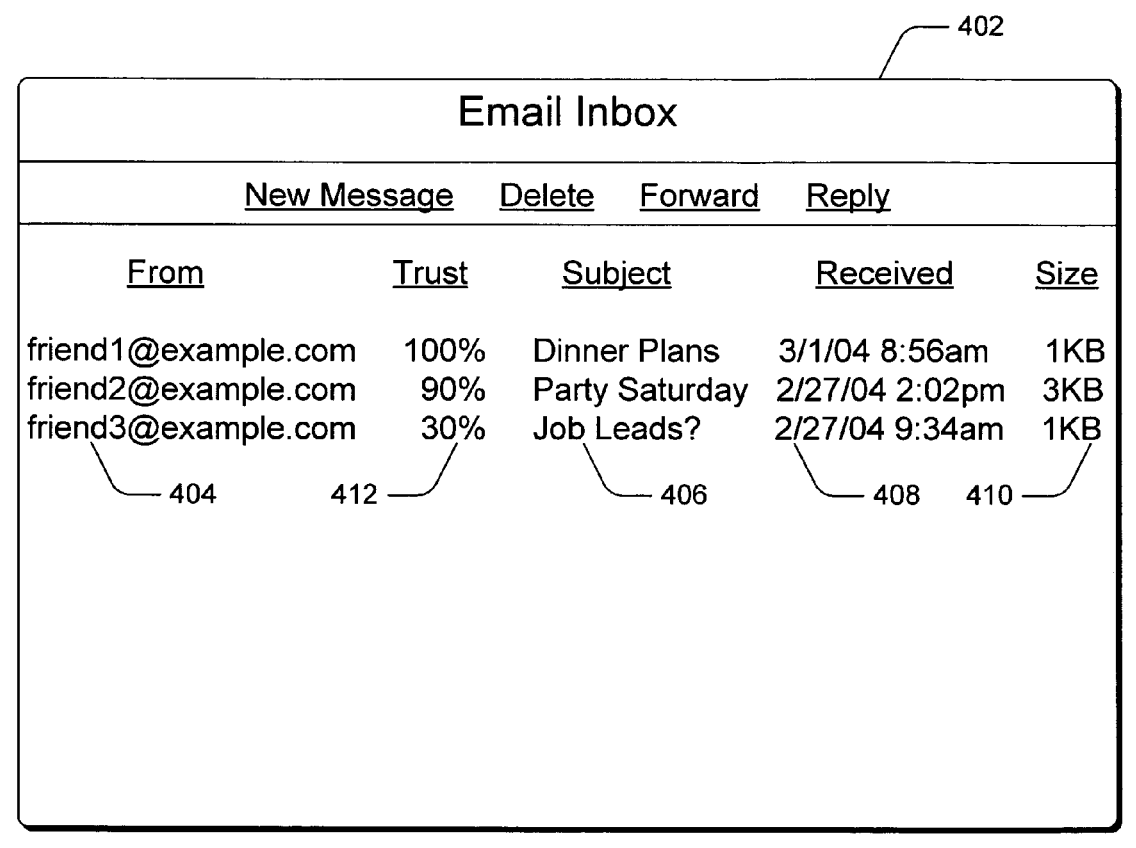

| Email Inbox | | | | |
|---|---|---|---|---|
| New Message  Delete  Forward  Reply | | | | |
| From | Trust | Subject | Received | Size |
| friend1@example.com | 100% | Dinner Plans | 3/1/04 8:56am | 1KB |
| friend2@example.com | 90% | Party Saturday | 2/27/04 2:02pm | 3KB |
| friend3@example.com | 30% | Job Leads? | 2/27/04 9:34am | 1KB |

*Figure 4*

SOCIAL NETWORK EMAIL FILTERING

TECHNICAL FIELD

This invention relates to email filtering, and more specifically to filtering email based on a social network.

BACKGROUND

As more and more individuals are utilizing electronic mail as a tool for communication, unsolicited junk email has become a problem. To enable users to reduce the amount of junk email ("spam") that they receive, many email filtering tools have been developed. One of the most effective email filters is an exclusive filter based on entries in a user's email address book. For example, an exclusive email filter identifies as junk mail, any email received from an email address not found in the recipients address book.

While this is an effective filtering technique, it is likely that many email messages may be identified as junk mail when, in fact, they are email that the recipient would like to receive. For example, if a user has the email address of a friend in their address book, emails from that friend will be received. However, if the friend passes on the user's email address to another friend, any emails received from that individual will be classified as junk mail until the user adds the new friend's email address to their address book.

Accordingly, a need exists for an email filter that classifies an email received from a friend of a friend as being a trusted email rather than a junk email.

SUMMARY

Techniques for filtering email messages based on a social network are described. A first level of a user's social network is determined based on email addresses stored in the user's address book. Those email addresses are used to identify additional address books that belong to friends of the user, Additional members of the user's social network are determined based on email addresses stored in the additional address books that belong to friends of the user. The social network may be limited to any number of such iterations.

Trust levels may be assigned to email addresses that are part of a user's social network. Trust levels may be based on how far a particular email address is removed from the user and/or on how often a particular email address appears within the social network.

When an email message is received that is addressed to the user, the email address from which the message was sent is compared to the email addresses that are part of the user's social network. If the address is found, then the trust level associated with the email address is applied to the received message. On the other hand, if the address is not found, then the message is flagged as junk email.

BRIEF DESCRIPTION OF THE DRAWINGS

FIG. 4 is a display screen diagram of an exemplary email inbox user interface for displaying email messages received through a social network email filter.

DETAILED DESCRIPTION

Overview

The embodiments described below provide techniques for filtering email based on a user's social network. Email addresses stored in the user's address book are assumed to belong to friends of the user. Accordingly, as in an exclusive email filtering system, emails received from addresses stored in the user's address book are allowed, and are not flagged as junk email. A user's friends (as identified by addresses in the user's address book), being part of the user's social network, are trusted to have "friendly" addresses stored in their address books as well. Accordingly, in addition to explicitly trusting (i.e., not flagging as junk email) messages received from addresses stored in the user's address book, messages received from addresses stored in the user's friends' address books are also trusted.

Social Network

Figure 1:
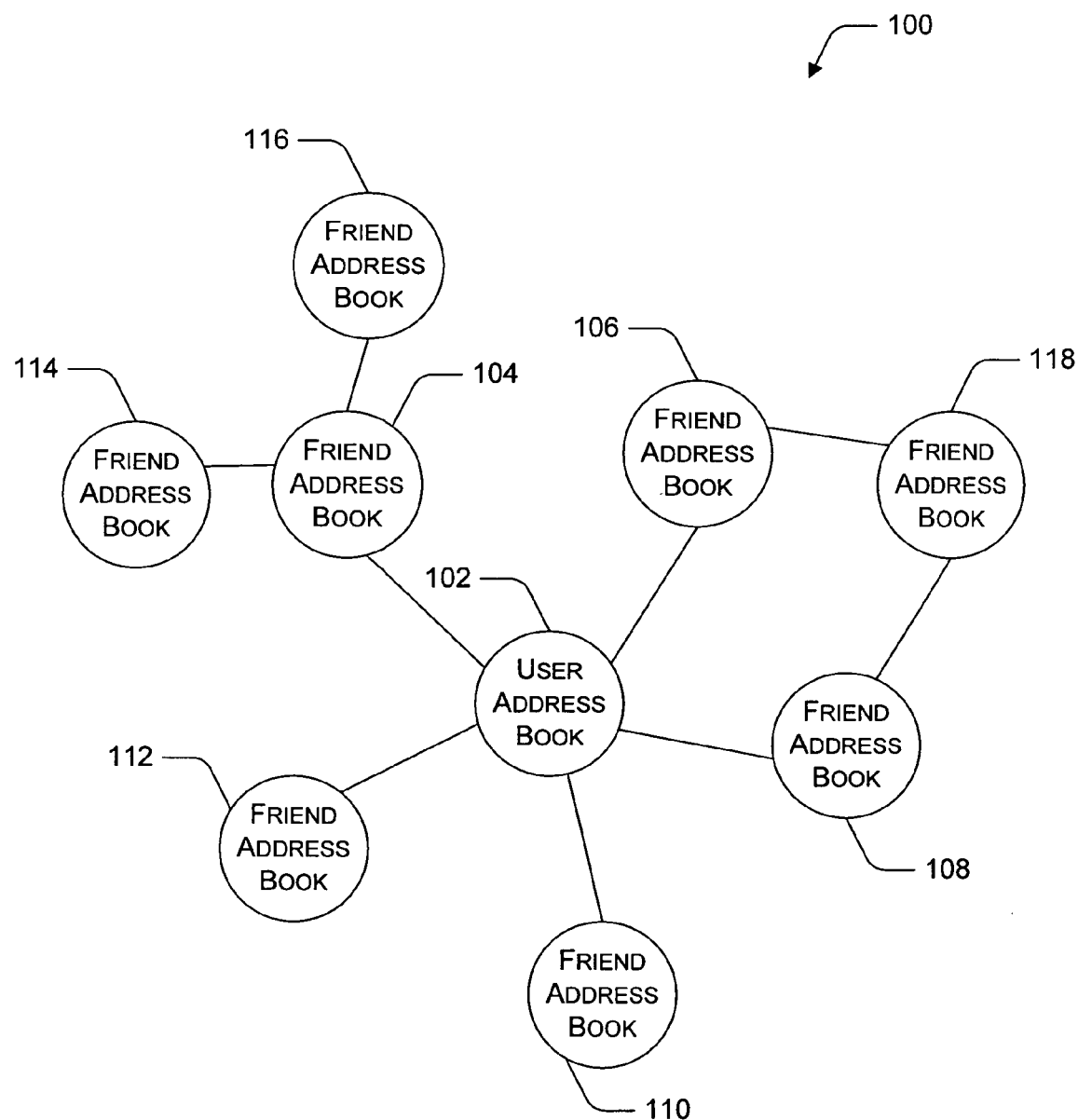
FIG. 1 is a block diagram that illustrates an exemplary social network associated with a particular user.

FIG. 1 illustrates an exemplary email social network 100 associated with a particular user. A user stores email addresses associated with their friends in user address book 102. Those friends (identified by addresses in the user address book 102) may also have address books. For example, user address book 102 may include email address associated with five friends of the particular user. Those friends may also have email address books, represented by friend address books 104, 106, 108, 110, and 112. Similarly, individuals identified by email addresses stored in friend address books 104, 106, 108, 110, and 112 may also have email address books. For example, two individuals represented by email addresses stored in friend address book 104 may have email address books, represented by friend address books 114 and 116. Similarly, an individual represented by an email address stored in both friend address book 106 and friend address book 108 may have an email address book, represented by friend address book 118.

Social Network Trust Levels

Figure 2:
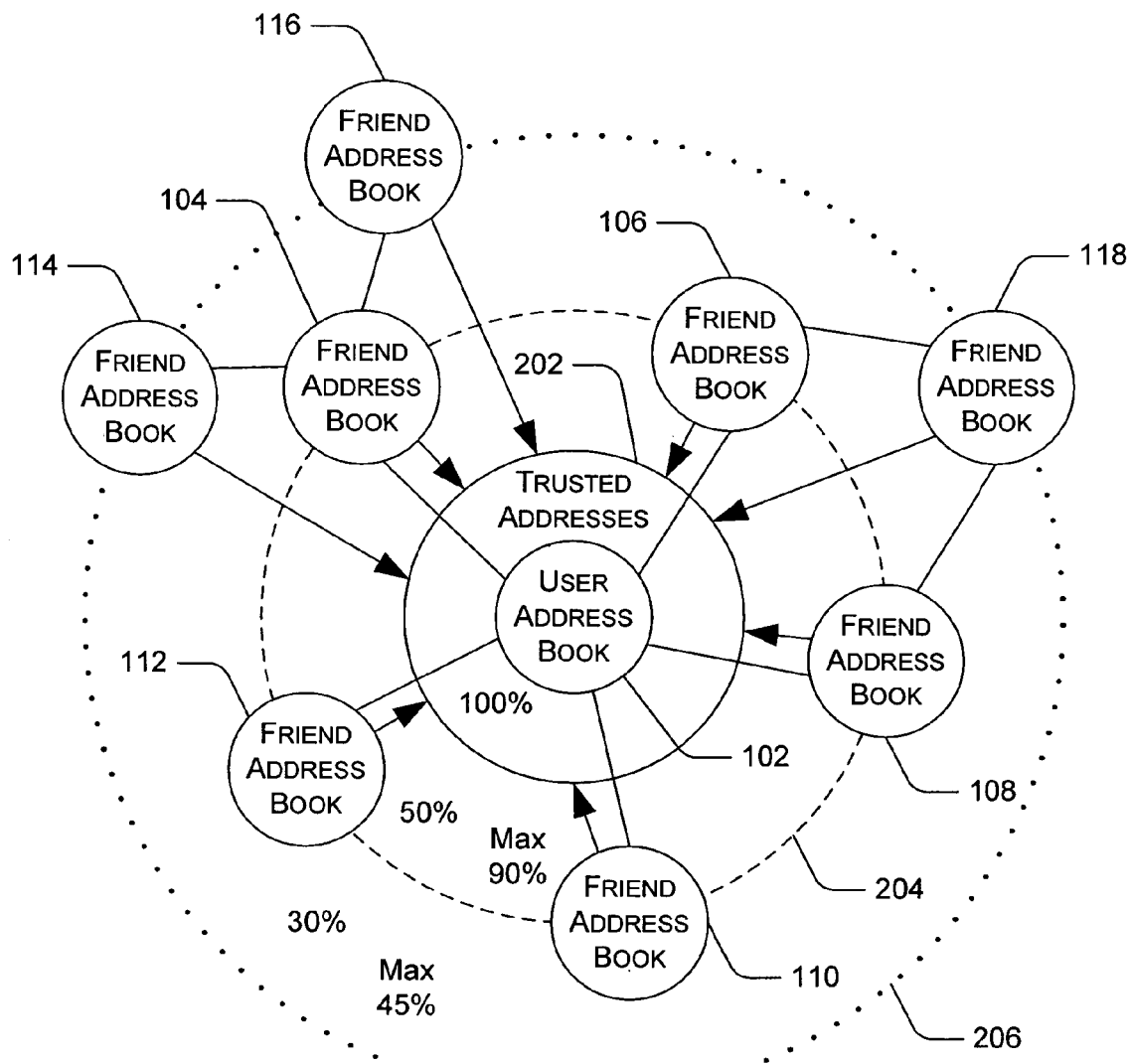
FIG. 2 is a block diagram that illustrates an exemplary way in which trust levels may be applied to elements of the social network illustrated in FIG. 1.

FIG. 2 illustrates example trust levels that may be associated with email address found in address books that are part of a user's social network. In an exemplary implementation, trust levels are associated with email addresses that are found in the various address books belonging to the user, friends of the user, and friends of friends of the user. The trust levels are established to enable a user to determine, when he or she receives an email message, how confident the user should be that the received message is not junk email. For example, messages received from email addresses that are stored in user address book 102 are assigned a high trust level, while messages received from email address that are stored in more distant friend address books (e.g., friend address books 114, 116, or 118) may be assigned a lower trust level.

In an exemplary implementation, a user's social network may be described in terms of degrees of separation. For example, email addresses specified in the user's address book 102 are zero degrees separated from the user. Addresses specified in address books that belong to the friends who are specified in the user's address book 102 are one degree separated from the user. Address books 104, 106, 108, 110, and 112 each belong to an individual associated with an email address that is found in the user's address book 102, and thus, are each one-degree removed from the user. Similarly, address books 114 and 116 are associated with individuals who are identified by email addresses stored in address book 104, and address book 118 is associated with an individual who is identified by an email address stored in both address book 106 and address book 108. Thus, friend address books 114, 116, and 118 are two-degrees removed from the user. Although not illustrated, any number of degrees of separation may be defined for a particular user's social network.

In an exemplary implementation, each degree of separation has an associated trust level. For example, those email address stored in the user address book 102 are zero-degrees removed, and are 100% trusted. Therefore, trusted addresses circle 202 includes all of the email addresses stored in user address book 102. Dashed line 204 represents those address books that are one-degree removed from the user. In the illustrated example, email addresses stored in the one-degree removed address books (e.g., friend address books 104, 106, 108, 110, and 112) are assigned a 50% trust level. Similarly, dotted line 206 represents those address books that are two-degrees removed from the user. In the illustrated example, email address stored in the two-degrees removed address books (e.g., friend address books 114, 116, and 118) are assigned a 30% trust level.

The trust levels described herein are given only as an illustration. It is recognized that any number of different methods may be used for determining a trust level associated with a particular email address, based on how far removed it is from a particular user.

In the described implementation, trust levels are assigned to email addresses that are added to the trusted addresses circle 202 from the various degrees of separation. In addition, a trust level associated with a particular email address may be increased if the email address is found multiple times. For example, if a particular email address is not stored in user address book 102, but is stored in three friend address books that are one-degree removed from the user (e.g., friend address books 108, 110, and 112), then that particular email address may be assigned a trust level equal to 150% (i.e., 50%+50%+50%; one rating of 50% for each one-degree removed friend address book in which the email address is stored).

However, to prevent an email address that is not stored in the user address book 102 from being assigned a trust level greater than 100%, each degree of separation may have an associated maximum trust level. For example, one-degree of separation may have a maximum trust level of 90% and two-degrees of separation may have a maximum trust level of 45%. Given these maximums, an email address that is not stored in user address book 102 cannot be assigned a trust level greater than 90%. Similarly, an email address that is not stored in user address book 102 or friend address books 104, 106, 108, 110, or 112 (but is stored in at least one of friend address books 114, 116, or 118) cannot be assigned a trust level greater than 45%.

In the described exemplary implementation, the maximum trust level allowed for a particular email address is determined by the closest degree of separation in which the email address is found. For example, an email address that is found in friend address book 114, friend address book 116, and friend address book 118 may be assigned a trust level of 45% (30% from address book 114+30% from address book 116+30% from address book 118=90%, but the maximum for two-degrees removed is 45%). On the other hand, an email address that is found in friend address book 112, friend address book 114, and friend address book 118 may be assigned a trust level of 90% (50% from address book 112+30% from address book 114+30% from address book 118=110%, but the maximum for one-degree removed is 90%).

In an exemplary implementation, a user can specify a degree to which email messages received from friends' friends are to be trusted. For example, if a user specifies a zero-degree trust, then only messages received from email addresses specified in the user address book 102 are trusted; if a user specifies a one-degree trust, then messages received from email addresses specified in the user address book 102 or messages received from email addresses specified address books that are one-degree removed from the user address book 102 (e.g., address books 104, 106, 108, 110, and 112) are trusted.

In an alternate implementation, a user may also be allowed to specify the trust level to be applied to email addresses that are separated from the user by various degrees. For example, a default setting may assign a 50% trust level to email address that are one-degree removed from the user, but the user may be allowed to override that setting to assign, for example, a 70% trust level to email address that are one-degree removed from the user. Similarly, in an alternate implementation, a user may be allowed to customize a maximum trust level associated with various degrees of separation. For example, a default setting may enforce a maximum trust level of 90% for email addresses that are one-degree removed from a user, but the user may be allowed to override the default to assign a maximum trust level of 99% for email addresses that are on-degree removed from a user.

Social Network Filter Setup User Interface

Figure 3:
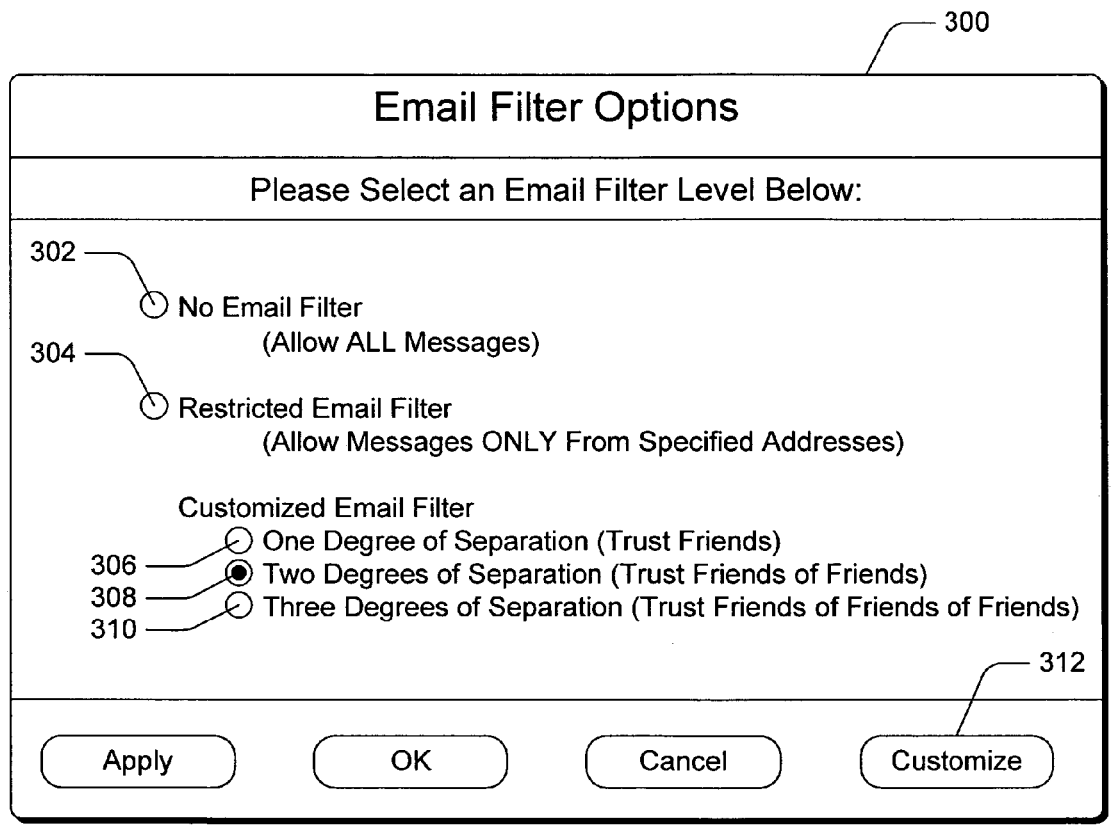
FIG. 3 is a display screen diagram of an exemplary user interface that enables a user to modify email filtering options associated with an email account.

FIG. 3 illustrates an exemplary email filter setup user interface 300. In the illustrated exemplary implementation, a user can select "No Email Filter" 302 to allow receipt of all email messages. Alternatively, a user can select "Restricted Email Filter" 304 to allow receipt of email messages only from addresses stored in the user's address book. To take advantage of a social network email filter, a user may select one of three "Customized Email Filter" options. A one-degree of separation option 306 may be selected to allow receipt of email messages from email address specified in the user's address book or in address books belonging to individuals who are identified in the user's address book (i.e., the user and the user's friends). A two-degrees of separation option 308 may be selected to allow receipt of email messages from email addresses found in address books belonging to the user, the user's friends, and friends of the user's friends. Similarly, a three-degrees of separation option 310 may be selected to allow receipt of email messages from email addresses found in address books belonging to the user, the user's friends, friends of the user's friends, and friends of those friends.

In an exemplary implementation, a customize button 312 may be enabled when a user selects one of the customized options 306, 308, or 310. By selecting the customize button 312, another screen (not shown) may be displayed that enables the user to customize a trust level to be associated with each degree of separation and/or to customize a maximum trust level to be associated with each degree of separation.

User Interface Display

FIG. 4 illustrates an exemplary user interface display 402 of an email inbox containing email messages received through a social network email filter. As in typical email system user interfaces, details of a received message are displayed, such as a from address 404, a subject 406, a received date and time 408, and a size 410. In the described exemplary implementation, email messages received through a social network email filter also have an associated a trust level 412, which may be displayed to indicate how trusted a particular message is. For example, messages received from friends of a user (e.g., based on addresses stored in the user's address book) may be 100% trusted, while messages received from friends of the user's friends may be less than 100% trusted. In the illustrated example, a numeric indicator is used to indicate a trust level associated with a received email message. In alternate implementations, trust levels associated with received email messages may be represented in other ways. For example, different icons or other graphical indicators may be used to represent trust levels.

Exemplary Environment

Figure 5:
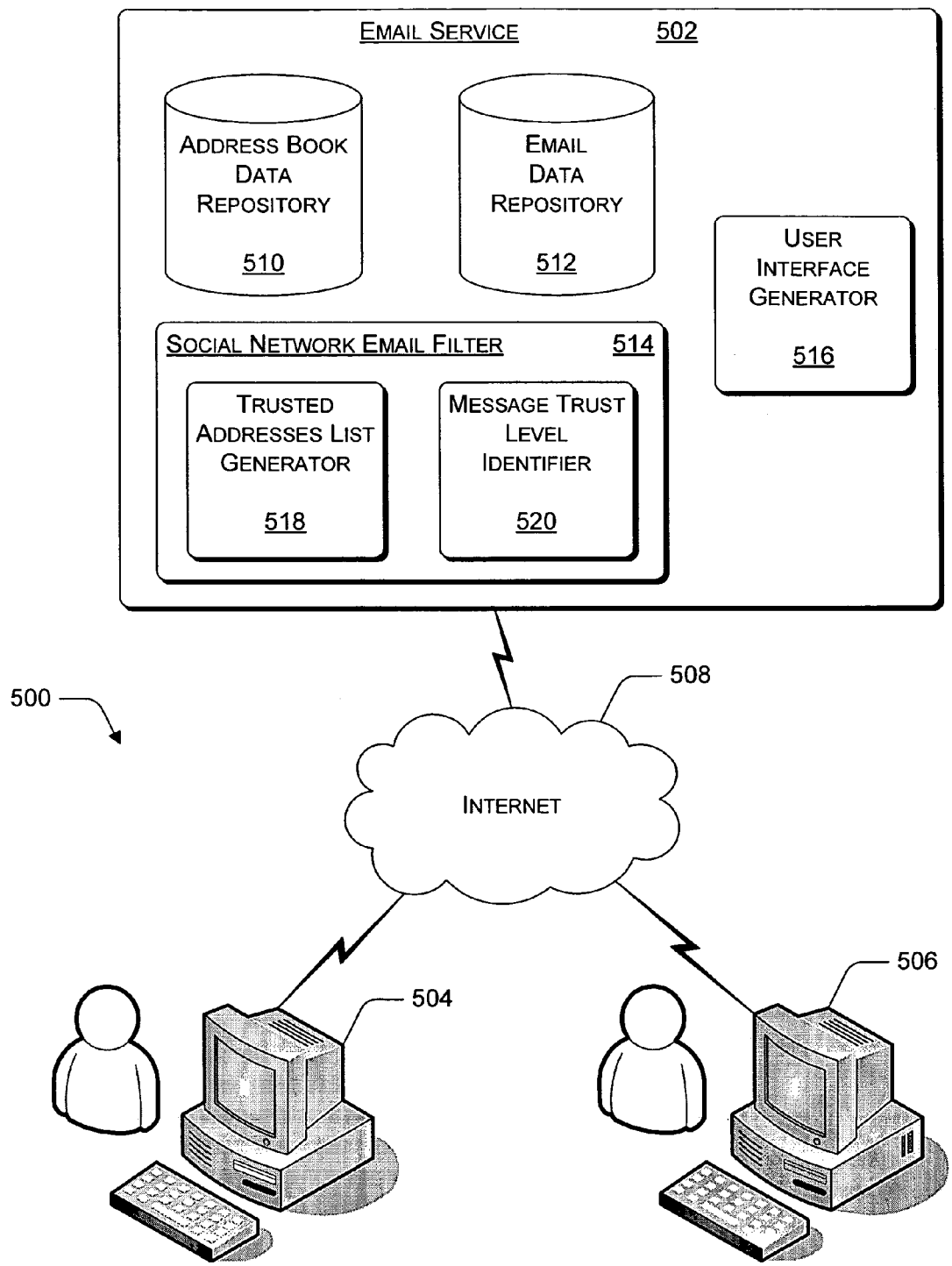
FIG. 5 is a block diagram that illustrates an exemplary environment in which a social network email filter may be implemented as part of a web-based email service.
Figure 6:
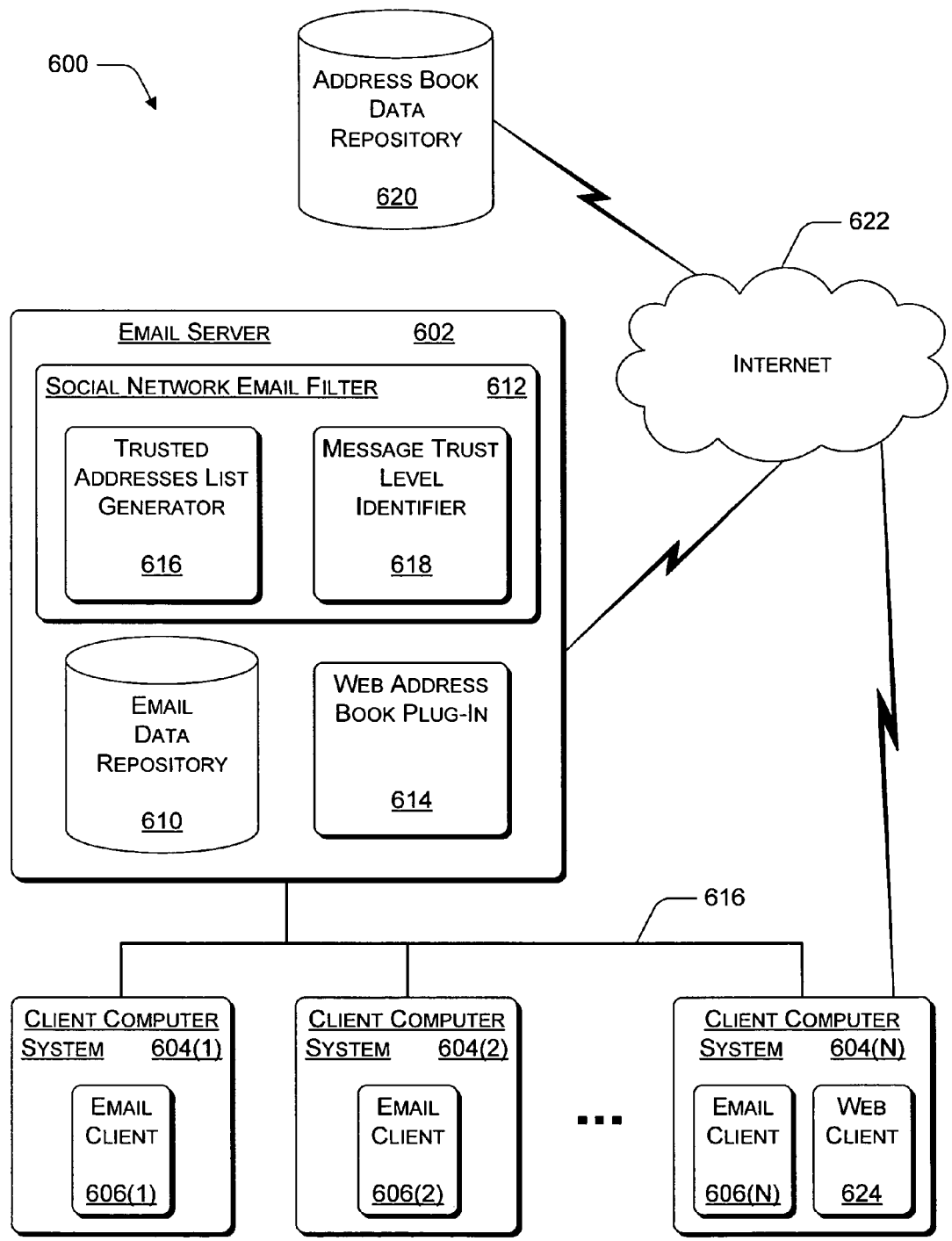
FIG. 6 is a block diagram that illustrates an exemplary environment in which a social network email filter may be implemented as part of a network-based email service.

FIGS. 5 and 6 illustrate two exemplary environments in which social network email filtering may be implemented. FIG. 5 illustrates an exemplary environment 500 in which a social network email filter may be implemented as part of a web-based email service. Environment 500 includes email service 502 and one or more client devices, such as client device 504 and client device 506. In the illustrated example, email service 502 is an Internet-based service that may be accessed by client devices 504 and 506 through the Internet 508. Email service 502 includes address book data repository 510, email data repository 512, social network email filter 514, and user interface generator 516. Email service 502 may also include other components not illustrated in FIG. 5, including, but not limited to, additional types of email filters.

Address book data repository 510 is configured to store email address books associated with multiple users of email service 502. Address book data repository 510 may store email addresses as well as other contact information, such as mailing address, phone numbers, and so on. Address book data repository 510 is also configured to store data that identifies trusted email addresses for users who have enabled social network email filter 514 for their account. In an exemplary implementation, trusted email addresses and trust levels associated therewith may be automatically updated periodically, such as once per week. Alternatively, trusted email addresses based on a user's social network may be stored in a separate data repository, for example, associated with social network email filter 514. In an alternate implementation, rather than storing data that represents a user's social network, social network email filter 514 may perform a real-time search and trust level determination for a particular email address when an email message is received from that address.

Email data repository 512 is configured to store actual email messages associated with email accounts of multiple users. Email data repository 512 may store incoming and/or outgoing email messages associated with users.

Social network email filter 514 is configured to determine, for a user account with social network email filtering enabled, from what email addresses messages are to be trusted, and what trust levels are to be associated with them. That is, social email filter 514 identifies address book data stored in address book data repository 510 to determine email addresses at various degrees of separation from a particular user and assigns appropriate trust levels to those email addresses. Social network email filter 514 is further configured to determine, when an email message is received, whether or not the message is to be trusted, and if so, to what level. Exemplary social network email filter 514 includes trusted addresses list generator 518 and message trust level identifier 520.

Trusted addresses list generator 518 is configured to identify email addresses that are to be part of a user's social network, and to determine trust values to be associated with each of those email addresses. For example, trusted addresses list generator 518 may search extract email addresses from data stored in address book data repository 510 that represents a particular user's address book. Each of the extracted addresses may be assigned a 100% trust level, indicating that each of those email addresses is 100% trusted by the user. Trusted addresses list generator 518 may then search address book data repository 510 for address books associated with any of the email addresses found in the user's address book. Email addresses may then be extracted from any identified address books, and assigned a trust level that is to be associated with addresses that are one-degree removed from the user. This process may be performed iteratively a pre-configured number of times to identify the email addresses that are part of the user's social network. Any duplicate entries may then be processed, for example, to remove the duplicates and increase the trust levels for those email addresses that appear multiple times within the user's social network.

Message trust level identifier 520 is configured to determine a trust level to be associated with a received email message. For example, if a message is received from an email address that is not found within the message recipient's social network, then the message may be classified as junk email (e.g. the message is assigned a 0% trust level). If a message is received from an email address that is found within the message recipient's social network, then the message is assigned the trust level that is associated with the email address from which the message was sent.

User interface generator 516 is configured to provide one or more user interface screens to users accessing email service 502. In an exemplary implementation, user interface generator 516 generates hypertext markup language (HTML) user interface screens that provide web-based access to a user's email account. One example user interface screen may provide access to an email inbox, such as the user interface screen illustrated in FIG. 4. Another example user interface screen may provide access to email filter customization, such as the user interface screen illustrated in FIG. 3. User interface generator 516 may also generate other user interface screens that are not illustrated or described herein.

FIG. 6 illustrates an alternate exemplary environment 600 in which a social network email filter may be implemented as part of an email server. Environment 600 includes network email server 602 and one or more client computer systems, such as client computer systems 604(1), 604(2), . . . , 604(N).

Client computer systems 604(1), 604(2), . . . 604(N) include email clients 606(1), 606(2), . . . , 606(N). Email clients 606 provide an interface to email server 602 to enable users to view received email messages, send email messages, and customize email account settings, such as email filter options. Communication between email server 602 and email clients 606 occurs over network 608.

In the illustrated exemplary implementation, email server 602 is implemented as a network email server that includes email data repository 610 and social network email filter 612. Network email server 602 may also include web address book plug-in 614.

Email data repository 610 is configured to maintain email data associated with user email accounts. The email data that is maintained may include, but is not limited to, incoming email messages, outgoing email messages, user account customization data, and user address books.

Social network email filter 612 includes trusted addresses list generator 616 and message trust level identifier 618. User email address books may be stored on email server 602 (e.g., as part of email data repository 610). In such an implementation, a user's social network may be defined in terms of other users who also store email address books on email server 602.

To enable the definition of user's social networks that include email addresses that are associated with individuals who may not be associated with email server 602, environment 600 also includes a web-based address book data repository 620, which may be accessed through the Internet 622. For example, client computer system 604(N) may also include a web client 624 that provides an interface through the Internet 622 to address book data repository 620. Address book data repository 620 may be implemented as a web-based subscription-type service that allows users to maintain web-based electronic address books. Address book data repository 620 may be accessed by any users with Internet access, not restricted to users of email server 602.

To identify members of a user's social network based on data stored in address book data repository 620, email server 602 may also include web address book plug-in 614 that enables email server 602 to search and extract data from address book data repository 620. In this way, a social network associated with a user of email server 602 may be expanded to include email addresses that are stored in web-based address book data repository 620.

Email Server System

Figure 7:
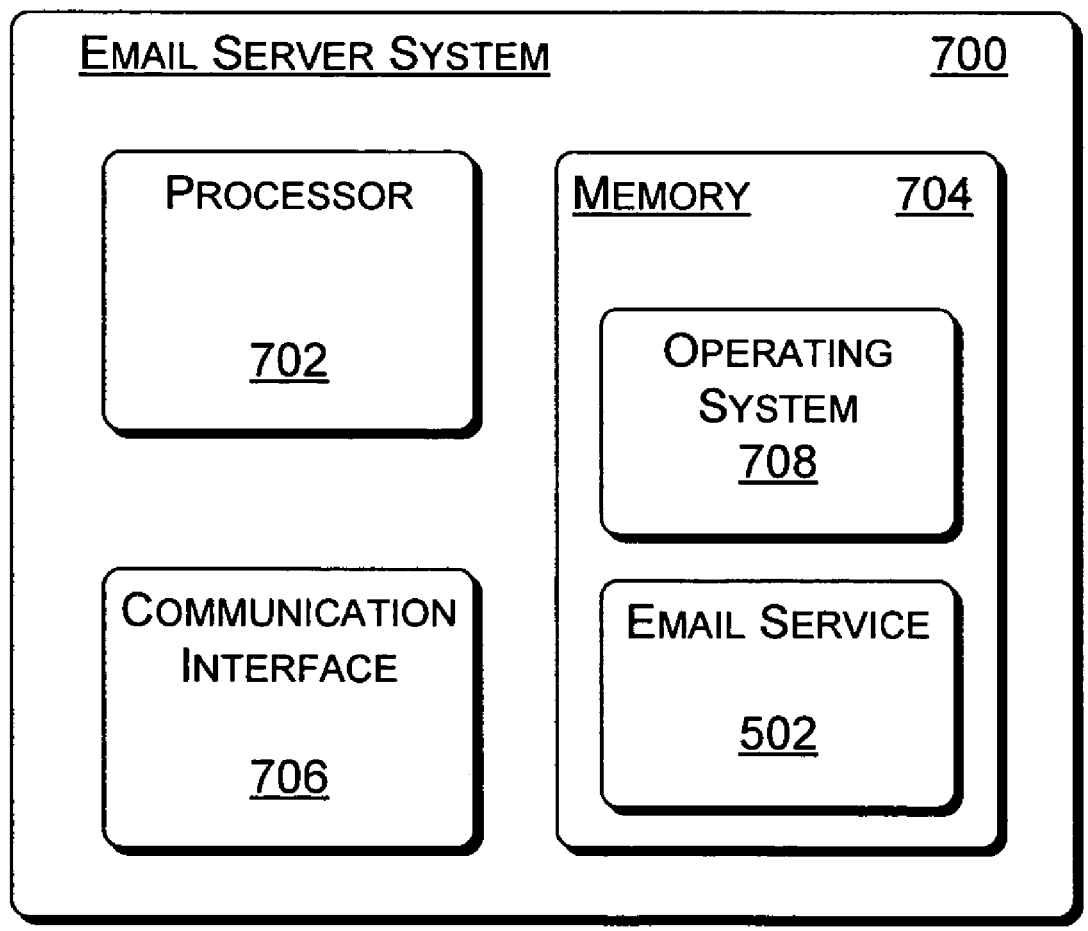
FIG. 7 is a block diagram that illustrates select components of an exemplary email server system.

FIG. 7 illustrates select components of an exemplary email server computer system 700 configured to support social network email filtering. Email server system 700 includes a processor 702, memory 704, and communication interface 706. An operating system 708 and email service 502 are stored in memory 704 and executed on processor 702. Communication interface 706 enables communication, for example over the Internet, between email server system 700 and one or more client devices.

Trusted Address List Generation Method

Figure 8:
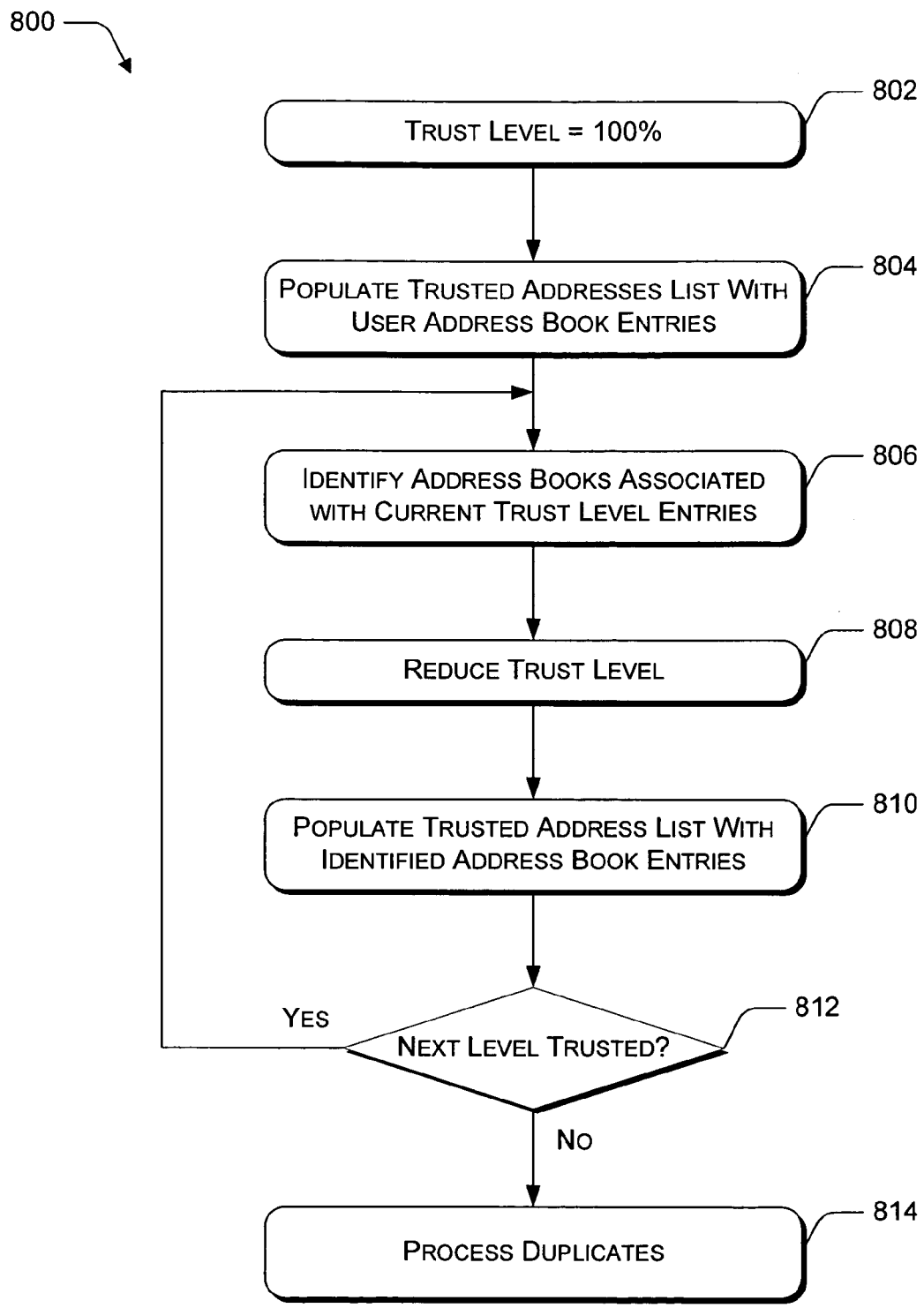
FIG. 8 is a flow diagram that illustrates an exemplary method for identifying email addresses that are part of a user's social network and assigning trust levels to individual ones of the identified email addresses.

FIG. 8 is a flow diagram that illustrates an exemplary method 800 for generating a list of trusted email address from which a particular user may receive email messages. The illustrated process can be implemented in any suitable hardware, software, firmware or combination thereof.

At block 802, the system sets a trust level equal to 100%. For example, social network email filter 514 may assign a trust level variable a value of 100%.

At block 804, social network email filter 514 populates a trusted addresses list associated with a user's email account with email addresses found in the user's address book. In the described exemplary implementation, the trusted address list includes a trust indicator, which, for each email address found, is set to the value of the trust level variable, which, at this point, is equal to 100%.

At block 806, social network email filter 514 identifies other address books associated with the email addresses that are found in the user's email address book. For example, any other users of email service 502 whose email address is stored in the user's address book are identified.

At block 808, social network email filter 514 reduces the value of the trust level variable to the trust level value to be associated with email addresses that are the next degree removed from the user. For example, if a user's friends are to be 50% trusted, the value of the trust level variable is set to 50%.

At block 810, social network email filter 514 adds to the list of trusted email addresses, those email addresses found in the address books identified as described above with reference to block 806. The current value of the trust level variable is associated with each of the added email addresses.

At block 812, social network email filter 514 determines whether or not the next level of the social network is to be trusted. In an exemplary implementation, a default of three degrees of separation may be used for the social network email filter. Alternatively, a user may be allowed to customize the greatest degree of separation to be trusted, as illustrated and described above with reference to FIG. 3. If users that are the next degree separated from the user are to be trusted (the "Yes" branch from block 812), then processing continues as described above with reference to blocks 806-812. Otherwise, duplicate entries in the list of trusted addresses are processed, as described below with reference to block 814.

At block 814, social network email filter 514 processes duplicate entries in the list of trusted addresses. In an exemplary implementation, duplicate entries are consolidated to one entry and the trust levels associated with the duplicate entries are added together to indicate that the particular email address is to be more trusted because it is found multiple times within the user's social network. Furthermore, as described above, each degree of separation may have an associated maximum trust level. The maximums are applied to the duplicate entries to ensure that after the trust levels for duplicate entries are added together, the value is not greater than the maximum for the degree of separation associated with the entry that is found closest to the user. For example, if a particular email address is found in multiple address books, with at least one being only one degree removed from the user's address book, then the maximum trust level that may be assigned to that email address is the maximum allowed for addresses that are one-degree removed. If, however, the closest of the duplicate entries for a particular email address is two-degrees removed from the user, then the maximum trust level that may be assigned for that email address is the maximum for addresses that are two-degrees removed from the user, which is typically lower than a maximum trust level that may be assigned to an email address that is only one-degree removed from the user.

Social Network Email Filtering Method

Figure 9:
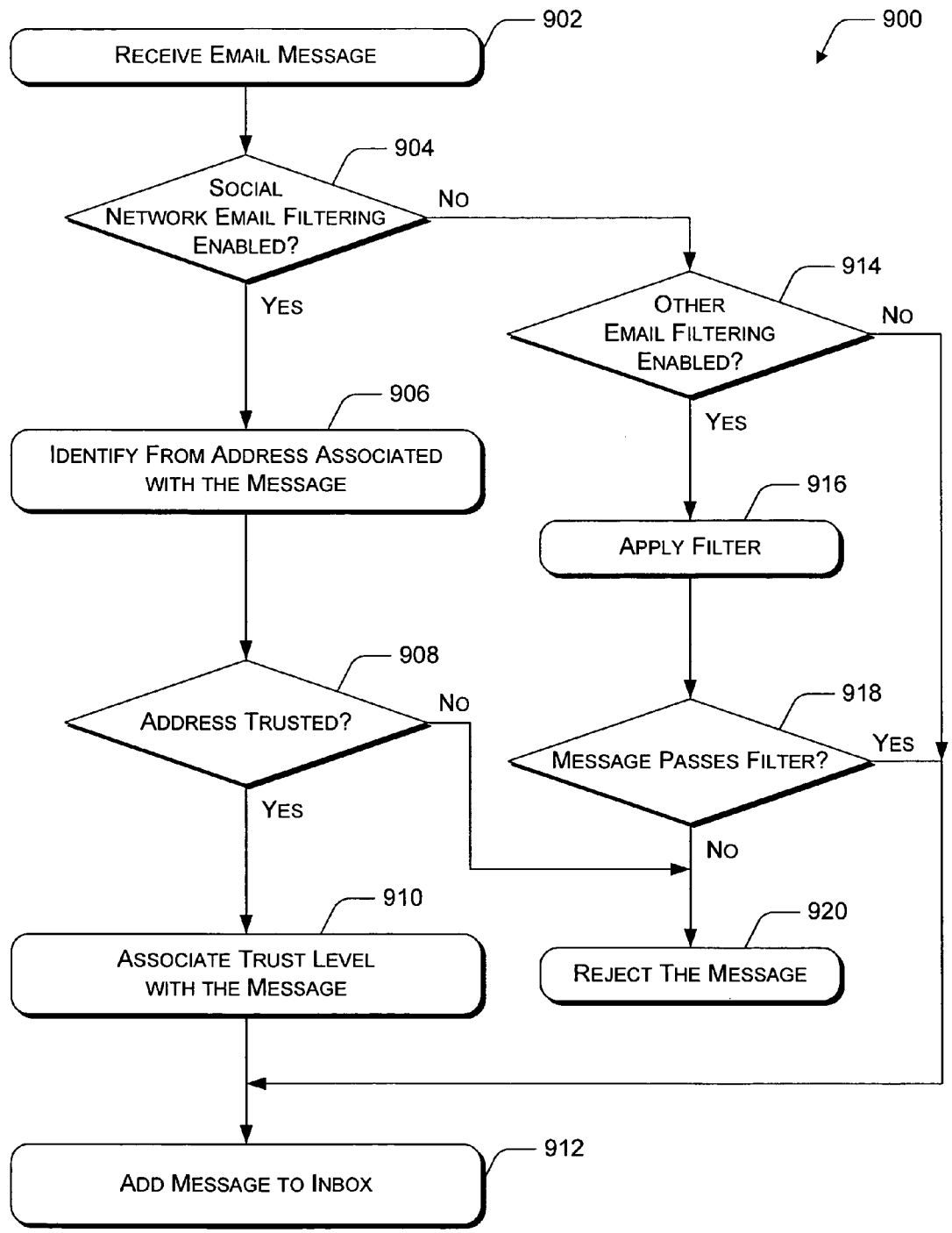
FIG. 9 is a flow diagram that illustrates an exemplary method for applying a social network email filter to a received email message.

FIG. 9 is a flow diagram that illustrates an exemplary method 900 for applying a social network email filter to a received email message. The illustrated process can be implemented in any suitable hardware, software, firmware or combination thereof.

At block 902, the system receives an email message. For example, email service 502 receives an email message addressed to a user of the email service.

At block 904, social network email service 502 determines whether or not social network email filtering is enabled for the user account to which the received message is addressed. If social network email filtering is enabled (the "Yes" branch from block 904), then processing continues as described below with reference to block 906. On the other hand, if social network email filtering is not enabled (the "No" branch from block 904), then processing continues as described below with reference to block 914.

At block 906, when it is determined that social network email filtering is enabled, email service 502 identifies the email address from which the message was sent. For example, social network email filter 514 examines the header information associated with the received message and extracts the sender's address.

At block 908, social network email filter 514 determines whether or not the sender's address is trusted. For example, social network email filter 514 compares the sender's address to addresses identified by trusted addresses list generator (as described above with reference to FIG. 8) as being part of the message recipient's social network. If the sender's address is not found in the message recipient's social network (the "No" branch from block 908), then processing continues as described below with reference to block 920.

At block 910, when the sender's address is found in the message recipient's social network (the "Yes" branch from block 908), social network email filter 514 associates a trust level with the received message. For example, message trust level identifier 520 associates with the received message, the same trust level that is associated with the sender's email address within the message recipient's social network.

At block 912, the received message is added to the recipient's email inbox.

At block 914, when a message is received and it is determined that social network email filtering is not enabled for the message recipient (the "No" branch from block 904), email service 502 determines whether or not another type of email filtering is enabled. If no other type of email filtering is enabled (the "No" branch from block 914), then as described above with reference to block 912, the received message is added to the recipient's email inbox.

At block 916, if another type of email filtering is enabled (the "Yes" branch from block 914), email service 502 applies the appropriate email filter to the received message.

At block 918, email service 502 determines whether or not the message passes the appropriate email filter. If the message passes the filter (the "Yes" branch from block 918), then the message is added to the recipient's email inbox, as described above with reference to block 912.

At block 920, if the message does not pass the filter (the "No" branch from block 908 or block 918), email service 502 rejects the message. Message rejection may implemented by flagging the received message as junk mail. Alternatively, message rejection may be implemented by deleting the message.

CONCLUSION

The techniques described above enable social network email filtering. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   defining a social network of a user, wherein:
      email addresses specified in an electronic address book belonging to the user are defined as being zero degrees separated from the user; and
      email addresses specified in an electronic address book that belongs to an owner of an email address that is zero-degrees separated from the user are defined as being one degree separated from the user;
   identifying an email address associated with an email message that occurs within the user's social network;
   in response to identifying the email address associated with the email message, associating a trust level with the email address associated with the email message, the trust level being based, at least in part on a number of degrees of separation between the user and the email address associated with the email message;
   determining that the email address associated with the email message occurs more than once within the user's social network; and
   in response to determining that the email address associated with the email message occurs more than once within the user's social network, increasing the trust level associated with the email address associated with the email message to indicate that the email address associated with the email message is more trusted because it occurs more than once within the user's social network.

2. The method as recited in claim 1 wherein the first trust level is represented as a numerical value.

3. The method as recited in claim 1 wherein the identifying the email address comprises extracting the email address from the address book belonging to the user.

4. The method as recited in claim 1 wherein the identifying the email address comprises extracting the email address from an address book belonging to an owner of an email address that was extracted from the address book belonging to the user.

5. The method as recited in claim 1 wherein a first trust level assigned to a first email address is less than a second trust level assigned to a second email address, thereby indicating that a likelihood that an email message received from the first email address is junk email is greater than a likelihood that an email message received from the second email address is junk email.

6. The method as recited in claim 1 wherein the increasing comprises:
   identifying for the email address that occurs more than once within the user's social network, a degree of separation associated with an occurrence that is closest to the user;
   determining a maximum trust level associated with the degree of separation; and
   limiting the trust level associated with the email address that occurs more than once to the maximum trust level.

7. The method as recited in claim 1 further comprising:
   receiving an email message addressed to the user;
   determining whether an email address from which the email message was sent is in a social network associated with the user; and
   in an event that the email address from which the email message was sent is in the social network associated with the user:
      associating a trust level with the message, the trust level being associated in terms of the social network, with the email address from which the email message was sent; and
      displaying an indication that the email message has been received, wherein the indication that the email message has been received comprises an indication of the trust level that has been associated with the message.

8. A memory encoded with computer-readable instructions that, when executed by a computer, cause the computer to implement the method as recited in claim 1.

9. An email system comprising:
   an email data repository configured to manage incoming and outgoing email messages associated with a user's email account; and a social network email filter configured to filter an incoming email message addressed to the user's email account based on whether an email address from which the incoming email message is received is part of a social network associated with the user's email account, wherein the social network email filter comprises:

a trusted addresses list generator configured to:

identify email addresses that are within the user's social network; and assign a trust level to each email address that is within the user's social network, wherein the trust levels that are assigned are based, at least in part, on:

a number of degrees of separation between a particular email address and the user, such that email addresses having fewer degrees of separation are more trusted than email addresses having more degrees of separation; and a frequency of occurrence of a particular email address within the user's social network, such that a first email address having a particular degree of separation from the user is assigned a first trust level and a second email address having the same particular degree of separation from the user is assigned a second trust level, greater than the first trust level, based on the second email address occurring more times within the user's social network than the first email address; and a message trust level identifier configured to associate a trust level with an incoming email message based on a trust level assigned to an email address from which the incoming email message was sent.

10. A memory encoded with computer-readable instructions that, when executed by a computer, cause the computer to perform a method comprising:

defining a social network associated with an email account, such that:

a first email address stored in an address book associated with the email account is identified as a first-level email address; and a second email address stored in an address book associated with the first-level email address is identified as a second-level email address;

associating a first trust level with the first-level email address;

associating a second trust level with the second-level email address, wherein a difference between the first trust level and the second trust level indicates that the first-level email address is more trusted to not send spam emails than the second-level email address;

receiving an email message addressed to a particular email account;

determining a sending email address from which the email message was sent;

determining whether the sending email address is part of a social network associated with the particular email account;

in an event that the sending email address is not part of the social network associated with the particular email account, flagging the email message as junk mail; and in an event that the sending email address is part of the social network associated with the particular email account:

determining a trust level associated with the sending email address within the social network;

associating the trust level with the email message; and forwarding the email message to an inbox associated with the particular email account, whereby an indication of the email message is displayable along with an indication of the trust level associated with the email message.

11. The memory as recited in claim 10, wherein the method further comprises defining the social network such that:

a third email address stored in an address book associated with the second-level email address is identified as a third-level email address within the social network.

12. A memory encoded with computer-readable instructions which, when executed by a computer, cause the computer to perform a method comprising:

receiving an email message addressed to a particular email account; determining sending email address from which the email message was sent;

determining whether the sending email address is part of a social network associated with the particular email account;

in an event that the sending email address is not part of the social network associated with the particular email account, flagging the email message as junk mail; and in an event that the sending email address is part of the social network associated with the particular email account;

determining a trust level associated with the sending email address within the social network;

associating the trust level with the email message; and forwarding the email message to an inbox associated with the particular email account, whereby an indication of the email message is displayable along with an indication of the trust level associated with the email message.

* * * * *